(No Model.)
N. HELMER.
PROCESS OF LIBERATING OZONE.
No. 509,163. Patented Nov. 21, 1893.
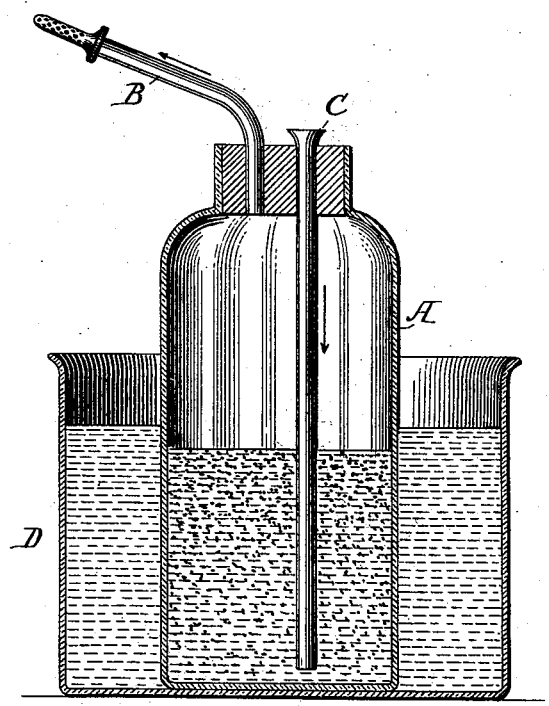
Witnesses
Jno. G. Hinkel
H. S. McArthur
Inventor
Nicholas Helmer
By Foster Freeman
Attorneys

UNITED STATES PATENT OFFICE.

NICOLAS HELMER, OF NEW YORK, N. Y.

PROCESS OF LIBERATING OZONE.

SPECIFICATION forming part of Letters Patent No. 509,163, dated November 21, 1893.

Application filed September 26, 1891. Serial No. 406,911. (No specimens.)

*To all whom it may concern:*

Be it known that I, NICOLAS HELMER, a citizen of the United States, residing at New York, in the county and State of New York, have invented certain new and useful Improvements in Processes of Using Peroxide of Hydrogen, of which the following is a specification.

My invention has for its object to provide an improved process whereby ozone may be quickly and freely liberated to be readily used on various applications, for instance as a medicament in the treatment of various forms of disease or for purifying the air of a room, and it consists in the process substantially as hereinafter more particularly set forth. The antiseptic and curative qualities of the peroxide of hydrogen have been recognized and its use is extending very rapidly in the profession in the treatment of various diseases as well as in purifying the atmosphere. One of the most common forms of using this material has been as an inhalent where the curative or remedial action depends upon the liberation or formation of ozone and the application of this ozone to the part or portion to be treated.

It is well known in the art that peroxide of hydrogen is an unstable substance and as it readily parts with a portion of its oxygen it is difficult to secure it in a stable condition. In order to avoid this it has been common to use certain acids in its manufacture and much of the product found in the market contains more or less quantities of these acids which are generally phosphoric or hydrochloric acid used for the purpose of maintaining a stable composition, and it is well known that these acids are exceedingly dangerous to the patient when such forms of peroxide of hydrogen are used. It is known, however, that a stable compound can be made which will retain all of its oxygen under higher temperatures than usual and which may be of definite and known composition and which shows absolutely no trace of any acid, but there is also a disadvantage in using this pure and definite composition for medicinal purposes, as the ozone is not readily formed. I have discovered that the ozone may be secured by the use of this chemically pure and definite composition of peroxide of hydrogen in such manner that it may be safely and effectively applied as an inhalent or as a spray by submitting the solution to the action of an alkali or its equivalent which insures the liberation of ozone.

In carrying out my invention I preferably make use of any ordinary inhaler, such for instance as is illustrated in the accompanying drawing which shows a vessel A, having a closed mouth through which passes a nozzle or spray device B, and also through which extends a tube C, reaching nearly to the bottom of the vessel. This inhaler may be used by being inserted in a bath B, which may be an ordinary water bath by means of which the temperature of the inhaler and its contents may be maintained at any desired degree, but I have found that the bath is not necessary. I preferably fill the inhaler about one-half full with water containing a quantity of alkali or its equivalent in solution and while I have found that various alkalis may be used with greater or less advantage, I preferably make use of a solution of refined carbonate of potash. To this solution I then add the pure peroxide of hydrogen solution having a definite strength, such for instance as is known as a fifteen volume solution and as soon as this is mixed with the alkali solution the ozone will be eliminated and quickly and freely rise above the surface of the liquid and can be readily applied as an inhalent or as a spray according to the purpose for which it is desired to be used and in this way a very large quantity of pure ozone, uncontaminated by any deleterious substance or substances is provided in a manner to be readily and conveniently applied as a medicament or purifying agent and there are no traces of injurious acids or other objectional material.

While the proportion of alkali or its equivalent used with any specified quantity of the peroxide of hydrogen may vary within certain limits according to the alkali used and the composition to which it is to be applied, I preferably use them in about the proportion of one part of solution of alkali to one part of pure peroxide of hydrogen.

What I claim is—

1. The process of quickly liberating ozone from the peroxide of hydrogen in the treatment of diseases &c. which consists in adding the peroxide of hydrogen to a solution of an alkali, substantially in the manner hereinbefore set forth.

2. The process of quickly liberating free ozone which consists in adding peroxide of hydrogen to a solution of refined carbonate of potash, substantially as and for the purpose set forth.

3. The process of quickly liberating free ozone, which consists in submitting peroxide of hydrogen to the action of heat in the presence of a solution of an alkali, to which the peroxide is added substantially as and for the purpose set forth.

In testimony whereof I have signed my name to this specification in the presence of two subscribing witnesses.

NICOLAS HELMER.

Witnesses:
ANTHONY GREF,
CHARLES E. FOSTER.